United States Patent Office 3,302,785
Patented Feb. 7, 1967

3,302,785
PHOSPHATE MATRIX BENEFICIATION PROCESS
Ernest W. Greene, Westfield, N.J., assignor to Minerals & Chemicals Philipp Corporation, Menlo Park, N.J., a corporation of Maryland
No Drawing. Filed Oct. 14, 1963, Ser. No. 316,154
14 Claims. (Cl. 209—5)

This invention relates generally to the recovery of phosphate minerals from a specific type of phosphate matrix, as exemplified by Tennessee phosphate matrix. The invention is especially directed to a process for increasing the recovery of a phosphate-silica concentrate suitable for use as furnace feed in the production of elemental phosphorus from such matrices.

Phosphate rock normally occurs in phosphate matrices in association with siliceous impurities. The siliceous impurities include relatively coarse particles of quartz (sand) as a major gangue constituent and, usually, substantial quantities of clay colloids. The nature of the clay colloids varies with the location of the phosphate deposit. Most matrices include phosphate values in all particle size ranges, including some primary phosphate slimes in the submicron particle size range. The general procedure used to beneficiate a phosphate matrix will vary principally with the intended use of the phosphate minerals in the matrix. For example, Florida phosphate matrix is beneficiated by froth flotation, especially a two-stage froth flotation process, to provide a high grade phosphate product that is used in fertilizer manufacture. Before any beneficiation of Florida phosphate matrix is attempted, it is conventional procedure to remove the clay gangue material from the balance of the matrix. Clay occurs in the matrix in the form of aggregates or agglomerates and in order to remove the clay from the matrix, these agglomerates must be broken into colloidal particles by mechanically agitating the crushed matrix in water (blunging). The colloidal clay particles are then removed as a slime from the blunged pulp by a hydraulic washing or classification step. As far as I know, all commercial phosphate flotations entail such initial desliming steps. This practice is based on the firmly held belief that slimes, especially clay slimes, are detrimental to nonmetallic mineral flotation. Tennessee phosphate matrix is beneficiated to produce a phosphate-silica concentrate of at least 11 percent P grade (55 percent BPL or bone phosphate of lime). This concentrate is used as furnace feed in the production of elemental phosphorus. To obtain the concentrate, the Tennessee matrix is deslimed, as in Florida practice, by blunging, screening and classification to remove undesirable clay gangue. Tennessee phosphate adapted for use as furnace feed is not subjected to flotation in present practice since the clay slimes can be removed by blunging and hydraulic classification and there is no need to remove quartz gangue from the phosphate minerals.

When phosphate matrix is deslimed to remove clay colloids, any very finely divided (slimed) phosphate minerals that are present in the blunged matrix will report in the washer slimes along with the clay. Frequently, the phosphate minerals in washer slimes will account for a substantial percentage of the total phosphorus content of the original matrix. In commercial operations, these slimed phosphate minerals are discarded in slime ponds along with clay and desliming of phosphate matrices to eliminate clay inherently results in loss of phosphate minerals which are not recovered. Illustrative of the losses encountered in conventional phosphate recovery plants when washer slimes are discarded, is the 20 percent to 40 percent loss of phosphate values in commercial Tennessee phosphate recovery plants in which the matrix is beneficiated by blunging and hydraulic sizing, as described hereinabove.

Accordingly, one object of this invention is the provision of a method for recovering a substantial portion of the phosphate mineral values now being discarded with washer slimes.

Another objective is the provision of a novel process for beneficiating certain types of phosphate matrices, especially Tennessee phosphate matrices.

Still another object is to provide a novel and practical process for increasing overall recovery of valuable phosphate constituents from a specific type of phosphate matrix as compared with recoveries realized by present day commercial processes.

A more particular object of this invention is the provision of a method for increasing the overall amount of phosphate minerals that can be recovered in the form of a concentrate suitable for use as electric furnace feed from phosphate matrices of the type which contains friable agglomerates of finely divided phosphate minerals.

Another object is the provision of such a beneficiation process entailing froth flotation followed by hydraulic sizing.

Further objects and features of this invention will be apparent from a description thereof which follows.

The instant invention contemplates a novel method for recovering phosphate mineral values which would normally report in washer tailings along with clay and be discarded, whereby the overall amount of phosphate minerals recoverable from a phosphate matrix in the form of a phosphate-silica concentrate suitable for use as electric furnace feed is increased substantially.

A diagrammatic representation of the process of this invention is as follows:

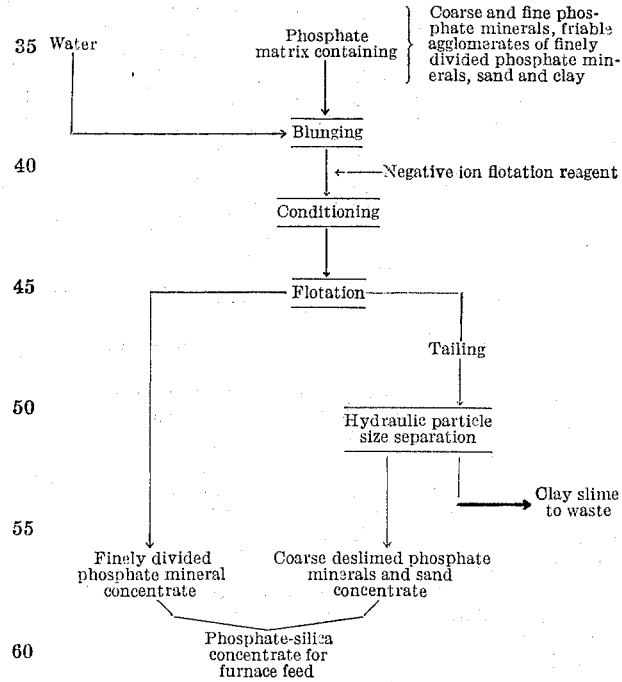

Stated briefly, in accordance with this invention, a phosphate matrix of the type which contains fine and coarse phosphate minerals, including agglomerates of fine-size phosphate minerals, together with a gangue composed of sand (quartz) and appreciable amounts of clay, is mechanically agitated with water (blunged) to break up the balls of the clay, as a result of which said phosphate agglomerates disintegrate into fine-sized phosphate minerals. A clay dispersant (deflocculating agent) is incorporated into the resulting aqueous pulp of blunged matrix, either during or after blunging, and without removing slimes, the dispersed aqueous pulp is subjected to negative-ion froth flotation with a carboxylic collector reagent. Flotation produces a froth product which is a concentrate of phosphate minerals (especially finely divided phosphate minerals) and a tailing which is a concentrate of coarse phosphate minerals, sand and clay slime. The tailing product is then subjected to a hydraulic particle size separation to remove slime. The deslimed tailing, which is a mixture of coarse phosphate minerals and sand, or a desired size fraction of the deslimed tailing, is then combined with the froth product from the flotation step to provide a phosphate-sand mixture which can be used as electric furnace feed. The slime, which is discarded, consists for the most part of clay minerals, since phosphate minerals which normally report in phosphate washer slimes are recovered by flotation before the matrix is deslimed.

The process may be modified by further beneficiating either the froth product or deslimed tailing of the flotation operation as by screening, tabling, or further froth flotation with selective reagents, such as the reagents used in the second stage of Florida phosphate rock flotation.

The phosphate matrix beneficiation process of the instant invention represents a fundamental departure from conventional phosphate recovery processes in that a pulp of the matrix, without a preliminary desliming step, is subjected to froth flotation to obtain a slimed phosphate concentrate as the float product. Desliming is carried out after flotation, not prior to flotation, as in convention Florida phosphate recovery processes, and the slime product is extremely low in phosphate values as compared with the slimes obtained in conventional phosphate recovery processes.

The selective flotation of slimed phosphate minerals from clay contaminated gangue, in accordance with the process of this invention, also represents a fundamental departure from prior art flotation processes, such as the process described in U.S. 1,585,756 to Borcherdt, in which colloids are removed as a whole (nonselectively) by froth flotation from a slimed ore before the balance of the ore is beneficiated.

It was indeed surprising and unexpected that slimed phosphate minerals could be selectively floated from the balance of a Tennessee phosphate matrix in the presence of clay colloids with simple inexpensive flotation reagents since it is well known that clay slimes usually inhibit selective flotation and are normally removed from ores before the ores are beneficiated by froth flotation. The surprising results were attributed to a unique property of the Tennessee matrix that distinguished such phosphate matrix from other slimed phosphate matrices which did not respond to the process. The distinguishing property or characteristic of the Tennessee matrix that rendered it suitable for the process was found to be the presence in the Tennessee matrix of plus 325 mesh agglomerates of very finely divided phosphate minerals. It was theorized that attrition phosphatic slimes are unavoidably formed when matrices containing these phosphatic agglomerates are blunged to remove clay and that such slimed phosphate mineral particles, unlike primary phosphate slimes, are especially responsive to froth flotation. This theory has been substantiated by the fact that the process of the invention is inoperative with Florida matrices which contain appreciable primary phosphatic slimes but do not contain agglomerated phosphatic minerals. When a representative sample of a slimed Florida matrix which did not contain such agglomerates was subjected to the process of this invention, there was excellent phosphate flotation in the plus 325 mesh sizes. However, there was very little selectivity or recovery in the minus 325 mesh fraction of the matrix. As a result, with Florida matrix there was little recovery of slimed phosphate minerals which would normally be discarded with clay in washer tailings.

An advantage of the beneficiation process of this invention is that overall recovery of furnace feed from the phosphate matrix is appreciably greater than the phosphate recovery obtained with current practice. By way of example, with a representative Tennessee phosphate matrix presently beneficiated to provide furnace feed, it was found that from 20 percent to 25 percent more of the matrix could be recovered in the form of a concentrate suitable for furnace feed when the matrix was beneficiated in accordance with the method of this invention than when the matrix was simply blunged and deslimed in accordance with present Tennessee phosphate recovery practice. This result is believed to be brought about by the fact that attrition slimes are recovered by the process of this invention, whereas, in the commercial process they are discarded along with clay and primary phosphatic slime.

Still another important advantage is that in carrying out the process of the invention, waste slimes can be produced at a higher solids content than waste slimes from the present day commercial phosphate washer plants. In today's commercial plants in which the matrix is deslimed without dispersion before further beneficiation, dilute pulps of matrix must be used and the washer slimes are produced at an undesirably low level of 3 percent to 5 percent solids. As a result, the volume of waste slimes that must be discarded and disposed of in beneficiating a given weight of matrix is appreciable. Frequently, phosphate beneficiation is limited by the inability of the processors to dispose of the large volume of slimes. On the other hand, the process of this invention can be carried out with relatively high solids pulps, especially by incorporating a dispersing agent in the blunging water, and slime tailings can be produced at about 15 percent to 20 percent solids. The volume of effluent produced from a given weight of matrix can, therefore, be reduced appreciably from the volume of effluents presently obtained and the problem of slime disposal is simplified.

As brought out hereinabove, the process of this invention is applicable to the beneficiation of phosphate matrix which contains an appreciable quantity of agglomerates of friable, finely-divided phosphate mineral. The presence of these agglomerates and their friable nature can be readily detected in a phosphate matrix by simple inspection of a representative sample with an optical microscope. Magnifications of about $20 \times$ to about $120 \times$ are suitable.

The process of this invention is especially useful in the beneficiation of Tennessee phosphate matrix. The phosphate minerals in Tennessee matrix are believed to be collophane minerals and may include members of the isomorphic collophane group (apatite group), e.g., fluorapatite. X-ray diffraction studies indicate that clay minerals in these matrices are amorphous. Representative samples of Tennessee phosphate matrix contain about 8 percent to 9 percent P. When a typical matrix is blunged, about 30 percent to 40 percent of the phosphate mineral values of the matrix will be in the form of a minus 325 mesh slime which will be discarded with current practice. Of the minus 325 mesh portion of the blunged matrix, substantially all of the particles will be finer than about ten microns and a major weight proportion of the particles will be in the submicron size range (as determined by sedimentation procedure).

In preparing the matrix for treatment by the process of this invention, the crude matrix is crushed and screened in the manner usual for the preparation of a phosphate matrix for hydraulic washing. The matrix is blunged in water in the conventional manner to disperse the clay. As mentioned, the mechanical agitation of the matrix during blunging inherently cause collophane-rich agglomerates to disintegrate into the individual phosphate mineral particles composing the agglomerates. While it would obviously be desirable to blunge the clay without breaking down the agglomerates of phosphate minerals, this result is not possible because the agitation required to break down the clay agglomerates and permit the removal of clay as a slime unavoidably causes phosphate agglomerates to break up. Blunging can be carried out in any agitated vessel or pump, provided the energy input is sufficient to disperse the clay agglomerates in the matrix into the ultimate clay particles composing these agglomerates.

The dispersant, which is essential to this process, may be added to the blunger. This is a departure from present washer practice in which dipersants are not employed. It is desirable to add the dispersant in the blunging water because by blunging the matrix with a dispersant the matrix can be blunged at appreciably higher solids. When these high solids pulps are employed in the flotation conditioning step, higher grade phosphate concentrates are usually obtained, as compared with the grade of concentrates obtained when the pulps are conditioned at lower solids. Moreover, by using high solids pulps in the flotation step, the waste aqueous slimes obtained by classification of the flotation tailings are more concentrated than if low solids pulps were to be used. As a result, a smaller volume of slime must be discarded. If desired, the dispersant can be incorporated with the matrix after the matrix has been blunged but before the matrix is conditioned for froth flotation.

As examples of suitable dispersants may be mentioned sodium silicate, ammonium hydroxide, sodium hydroxide, potassium hydroxide, polyphosphate dispersants, such as tetrasodium pyrophosphate, sodium carbonate and mixtures of sodium silicate with one or more of the aforementioned alkaline hydroxides. These dispersants are well-known in the art as clay dispersing or deflocculating agents. When present in a pulp of phosphate matrix, these dispersants apparently deflocculate or disperse finely divided phosphate mineral particles simultaneously while they deflocculate clay colloids in the pulp, as evidenced by the fact that, when a dispersant is incorporated into blunged matrix, slimed phosphate mineral particles do not settle out but remain suspended in the pulp along with clay colloids.

The collector reagent employed in the flotation step is preferably crude (unrefined) tall oil. Other carboxylic negative-ion reagents include fish oil fatty acids, oleic acid, resin acids, wood by-product fatty acids and higher sulfo fatty acids. A cooperative neutral hydrocarbon oil reagent such as fuel oil, kerosene, mineral oil or diesel oil, is also used. Especially good results have been obtained when an oil-soluble, water-insoluble petroleum sulfonate was substituted for a portion of the neutral oil cooperative collector reagent. Oil-soluble, water-insoluble petroleum sulfonates are prepared by sulfonation of suitable petroleum fractions with concentrated or fuming sulfuric acid and are commercially available in the form of solutions of the sodium, calcium, barium or ammonium salts in about an equal weight of mineral oil. These solutions may be used as the sole cooperative reagent or a mixture of the solution with additional neutral oil may be used. The oil-soluble petroleum sulfonates have a higher molecular weight than water-soluble petroleum sulfonates. Usually, the molecular weight of an oil-soluble petroleum sulfonate is at least 400.

During conditioning, the pH of the pulp should be maintained at a level within the range of 8.0 to 9.5. When necessary, sodium hydroxide or ammonium hydroxide should be added to the pulp to maintain the pulp at the desired pH.

Excellent results have been obtained in the flotation step with a wide variety of operating conditions and reagent poundage. Briefly, dispersants have varied from about 8 pounds of NaOH to 100 pounds of $Na_2SiO_3$. (All reagents reported as pounds per ton of dry matrix.) Collectors have varied from 8 pounds of crude tall oil and 16 pounds of fuel oil to 18 pounds of crude tall oil and 16 pounds of a solution of neutral calcium petroleum sulfonate in mineral oil. The solids in the conditioned pulp have ranged from 15 percent to 60 percent in these tests. The metallurgical results of these various flotation tests were generally similar. In each case, the P grade of the minus 325 mesh portion of the froth product was appreciably higher than the P grade of the minus 325 mesh portion of the flotation tailings, indicating that the reagents were highly selective to slimed phosphate mineral particles.

In commercial operation of the process, it may be desirable to screen out matrix particles which are appreciably larger than conventional flotation feed (e.g., particles appreciably larger than about 35 mesh) before the slimed matrix is sent to the flotation cells. The plus 35 mesh solids in the blunged pulp can be screened out of the pulp before or after conditioning of the matrix and only the minus 35 mesh fraction passed to the flotation cells. Since the plus 35 mesh fraction of the matrix is usually extremely rich in phosphate minerals, this fraction should be recovered and, if desired, combined with the froth product of the flotation step and deslimed flotation tailings.

As in other flotation processes, product grade and efficiency of concentration will be improved by refloating the froth product. In this particular flotation process there should be an advantage in recirculating middling material.

In laboratory scale operation, simple screening of the combined machine discharge products of the flotation process will suffice to separate the slimes, principally clay minerals, from the mixture of quartz and both pebble-size and sand-size phosphate minerals. The cut-off for the screening can be at 325 mesh, although a 200 mesh screen or a 400 mesh screen could be used. In commercial operation of the process, slimes are removed from the sand and coarse phosphates in a hydraulic classifier, such as, for example, a Dorrclone or a Hydro-Separator, and the slimes are discarded in a slime pond.

In the examples which follow, the weight percentages of various flotation products, such as the froth product (F.P.), first machine discharge product (M.D.–1), total machine discharge product (T–M.D.'s) are all reported on a moisture free basis, determined by heating representative samples of the products to constant weight at 250° F.

*Example I*

This example illustrates the recovery of a phosphate-silica furnace feed mixture from a sample of Tennessee phosphate matrix by the process of this invention.

A sample of Tennessee phosphate matrix was screened on a ½" screen. The plus ½" fraction was partially air dried to facilitate crushing and then crushed to minus ½" and combined with the minus ½" fraction from the screening operation. The minus ½" sample was blunged at 25 percent solids with soft water in an Airflow flotation machine for thirty minutes. The blunged matrix was screened with a 35 mesh screen. The plus 35 mesh matrix was then dried for purposes of analysis. The minus 35 mesh portion of the blunged matrix was agitated in a Fagergren flotation cell for five minutes with "O brand" sodium silicate, using 46.7 pounds of $Na_2SiO_3$ per ton of dry minus 35 mesh solids in the pulp. The pH of the dispersed pulp was 8.5.

The dispersed pulp was conditioned at 16.3 percent solids for seventeen minutes with the following reagents, which were added to the pulp in the order listed.

| Reagent: | Lbs. reagent/ton of minus 35 mesh solids |
|---|---|
| $NH_4OH$ [1] | 0.65 |
| Crude tall oil [1] | 7.1 |
| Neutral petroleum sulfonate reagent [1] | 7.1 |
| Crude tall oil | 0.8 |

[1] Added in form of emulsified mixture.

The neutral petroleum sulfonate was a solution of 41.0 percent by weight calcium petroleum sulfonate complex (2.85 percent Ca) in 58.5 percent by weight mineral oil and contained 0.5 percent by weight of water.

For the purpose of adjusting pH, ammonium hydroxide was added to the conditioned pulp in the form of a 5 percent aqueous solution. 0.65 pounds $NH_4OH$ was added per ton of minus 35 mesh solids in the pulp. The pulp was then subjected to froth flotation in a 1,000 gram minerals separation flotation machine with one rougher float and three cleaner floats, each of ten minutes duration. The froth product was recovered and each of the machine discharge products was wet screened through a 325 mesh screen to remove slimes.

In order to determine the particle size distribution of the phosphate minerals in the froth product, it was wet screened with a 325 mesh screen and the minus 325 mesh and plus 325 mesh fractions dried, weighed and analyzed for P. Also screened, weighed and analyzed for analytical purposes were each of the machine discharge products and a sample of blunged matrix which had not been subjected to flotation treatment or desliming.

Metallurgical results of the flotation step are reported in Table I, Part A. These results are reported on a total matrix basis to ascertain phosphorus grade and recovery in the flotation step and also on a minus 325 mesh basis to determine the selectivity of the flotation reagents for minus 325 mesh phosphate minerals.

Table I, Part B contains metallurgical data for the process of this invention. These data were obtained by calculating the grade and recovery of the product that would be obtained by combining the following: the whole froth product, the deslimed (plus 325 mesh) combined machine discharge products and the plus 35 mesh matrix which had been removed from the balance of the matrix before the flotation step.

Data in Table II, Part B, show that a phosphate product of 11.33 percent grade at an excellent weight recovery of 78.9 percent could be obtained by carrying out the process of the instant invention, leaving 21.1 percent of the phosphorus values in the form of a low grade tailing.

*Example II*

This example illustrates a preferred form of the invention in which a dispersant is included in the blunging water and the phosphate matrix is blunged and then conditioned at high solids. In this example, the entire matrix was sent to the flotation cell without screening out plus 35 mesh ore as was done in the previous example.

A sample of the same Tennessee phosphate matrix used in Example I was crushed to minus 2 mesh, as in the previous example. The crushed matrix was blunged at 50 percent solids for fifteen minutes in a paddle agitated mixer by adding the matrix sample to soft water while the water was being agitated and adding "O brand" sodium silicate in amount of 40.0 lbs. $Na_2SiO_3$ per ton of matrix. The blunged matrix was conditioned in the paddle agitated mixer with the following reagents, which were incorporated into the pulp in the order listed:

| Reagent: | Lb. reagent/ton of matrix |
|---|---|
| Crude tall oil [1] | 6.35 |
| Neutral petroleum sulfonate reagent (see example I)[1] | 6.35 |
| $NH_4OH$[1] | 1.0 |
| Crude tall oil | 0.7 |

[1] Added in form of emulsified mixture.

The pulp was conditioned at 44.4 percent solids and total conditioning time was seventeen minutes. The pH of the conditioned pulp was adjusted to 8.5 by addition of a 5 percent solution of ammonium hydroxide in amount of three pounds $NH_4OH$ per ton of pulp solids.

TABLE I.—METALLURGICAL RESULTS
A. FLOTATION

| Products | On Total Matrix Basis | | | On −325 Mesh Basis | | |
|---|---|---|---|---|---|---|
| | Wt. Percent | Percent P. | P. Dist., Percent | Wt. Percent | Percent P. | P. Dist., Percent |
| Head | | 8.58 | | | | |
| +35 mesh Matrix | 10.4 | 12.61 | 16.0 | | | |
| T-M.D.'s (−35 +325 mesh) | 5.1 | 8.47 | 5.3 | | | |
| T-M.D.'s (−325 mesh) | 42.9 | 4.05 | 21.1 | 65.6 | 4.05 | 47.6 |
| F.P. (−35 +325 mesh) | 19.1 | 11.36 { 14.75 | 34.3 | | | |
| F.P. (−325 mesh) | 22.5 | { −8.49 | 23.3 | 34.4 | 8.49 | 52.4 |
| Composite Matrix | 100.0 | *8.21 | 100.0 | 100.0 | *5.58 | 100.0 |

B. PROCESS OF THIS INVENTION

| F.P. T-M.D.'s (+325 mesh) Combined: +35 mesh Matrix | | | | | | |
|---|---|---|---|---|---|---|
| Total Concentrate | 57.1 | 11.33 | 78.9 | | | |
| Tailing (−325 mesh T-M.D.'s) | 42.9 | 4.05 | 21.1 | | | |

*Calculated Values.

Metallurgical data in Table I, Part A, for the flotation step, on a total matrix basis, show that 57.6 percent by weight of the P values in the matrix was recovered in the form of a concentrate of 11.36 percent P grade by flotation and that of this amount of phosphate recovered, 23.3 percent by weight represent phosphate values which would normally be discarded in the conventional desliming treatment. Data in Table I, Part A, also show that the grade of the minus 325 mesh froth product was 8.49 percent, more than double the grade of the minus 325 mesh fraction of the combined flotation tailings. These data therefore show that the flotation was highly selective to slimed phosphate minerals in the flotation pulp.

The conditioned pulp was transferred to a 1,000 gram minerals separation airflow flotation cell and given one rougher float and three cleaner floats, each float being ten minutes. The machine discharge products were combined and then wet screened through a 325 mesh screen to separate clay from coarse phosphate and sand in the flotation tailings. As in the previous example, flotation products were dried, screened and analyzed to determine the distribution of phosphorus in the products.

Metallurgical data for the flotation step and summarized results for the process of this invention are given in Table II.

TABLE II.—METALLURGICAL RESULTS

A. FLOTATION

| Products | On Total Matrix Basis | | | On −325 Mesh Basis | | |
|---|---|---|---|---|---|---|
| | Wt. Percent | Percent P. | P. Dist., Percent | Wt. Percent | Percent P. | P. Dist., Percent |
| Head | | 8.58 | | | | |
| T-M.D.'s (+35 mesh) | 12.5 | 12.29 | 18.6 | | | |
| T-M.D.'s (−35 +325 mesh) | 17.1 | 12.85 | 26.6 | | | |
| T-M.D.'s (−325 mesh) | 41.9 | 3.13 | 15.9 | 72.1 | 3.13 | 47.6 |
| F.P. (+35 mesh) | | | | | | |
| F.P. (−35 +325 mesh) | 12.3 | 14.35 | 21.4 | | | |
| F.P. (−325 mesh) | 16.2 | 8.88 | 17.5 | 27.9 | 8.88 | 52.4 |
| Composite Matrix | 100.0 | *8.25 | 100.0 | 100.0 | *4.73 | 100.0 |

B. PROCESS OF THIS INVENTION

| Products | Wt. Percent | Percent P. | P. Dist., Percent | | | |
|---|---|---|---|---|---|---|
| F.P. T-M.D.'s (+325 mesh) Combined: | | | | | | |
| Total Concentrate | 58.1 | 11.94 | 84.1 | | | |
| Tailing (−325 mesh T-M.D.'s) | 41.9 | 3.13 | 15.19 | | | |

*Calculated Values.

Data for the flotation step in Table II, Part A, show that the flotation step was highly selective to slimed phosphate minerals and that the minus 325 fraction of the froth product had a 8.88 percent P grade as compared with a grade of only 3.13 percent P for the waste slimes (i.e., the minus 325 mesh fraction of the combined machine discharge products).

Data in Table II, Part B, show that 84.1 percent of the P in the matrix could be recovered in the form of a product of 11.94 percent P grade (59.70 percent BPL) by combining the froth product with the deslimed flotation tailings.

Data in Table II also show that with this particular flotation treatment, the plus 325 mesh fraction of the froth product was of considerably higher grade than the finer fraction of the froth. This data, therefore, indicate that a higher grade total concentrate could be obtained at a somewhat lower weight recovery by combining all of the plus 325 mesh portion of the froth product and only part of the minus 325 mesh portion of the froth product with the deslimed flotation tailings.

Example III

Following is an example of the flotation of the whole matrix without separation of plus 35 mesh ore, using fuel oil as a cooperative collector reagent with tall oil.

A sample of the minus 2 mesh Tennessee phosphate matrix of Example I was blunged at 50 percent solids for fifteen minutes in soft water containing sodium hydroxide dispersant (5.5 lbs. NaOH/ton of matrix). The dispersion was conditioned at 50 percent solids in a paddle agitated mixer for a total of seventeen minutes with fuel oil in amount of 4.0 pounds per ton of matrix and with 9.0 pounds per ton of a mixture of equal parts by weight of fuel oil and crude tall oil. After reagentizing the pulp, the pH of the pulp was adjusted to 8.7 by addition of sodium hydroxide.

The pulp was transferred to a 1,000 gram minerals separation airflow flotation machine and given one rougher float and three cleaner floats. Each float was carried out for ten minutes. The machine discharge products were combined and then wet screened through a 325 mesh screen to separate clay gangue from coarse phosphate and sand in the flotation tailing.

An excellent P recovery of 83.7 percent was obtained in the form of a concentrate of 11.79 percent grade by combining all of the froth product with the plus 325 mesh portion of the combined machine discharge products.

Example IV

This example illustrates the application of the process of this invention to a Tennesee phosphate rock matrix having a higher silica content than the matrix of Example I.

The matrix was crushed and blunged as in Example II except that the "O brand" sodium silicate was added to the blunging water before addition of a minus 3 mesh sample of matrix. The flotation procedure of Example II was repeated with the whole matrix. The flotation reagents of Example II were used except that NH$_4$OH was not required to adjust the pH of the conditioned pulp.

The pH of the pulp after blunging was 9.3. After reagentizing, the pulp had a pH of 8.6.

The combined machine products were screened on a 325 mesh screen to remove clay slimes and the plus 325 mesh tailings screened on a 35 mesh screen for purposes of analysis. As in the previous examples, the froth product was screened for purposes of analysis. A sample of the blunged matrix was also screened on a 325 mesh screen to determine the grade of the slime material which would normally be discarded in washer tailings and to determine the resultant loss of phosphate mineral values. It was found that 34.0 percent by weight of the matrix was in the form of a 7.84 percent P grade slime which would normally be discarded.

Following are metallurgical data for the flotation products and for the concentrate that would be obtained by combining the entire froth product with the deslimed (plus 325 mesh) machine discharge products.

TABLE III.—METALLURGICAL RESULTS

| Products | Wt. percent | Percent P. | P. Dist., percent |
|---|---|---|---|
| Heads | | 9.46 | |
| T-M.D.'s (+35 mesh) | [19.1] | 10.59 | 22.1 |
| T-M.D.'s (−35 +325 mesh) | [10.8] | 3.92 | 4.6 |
| T-M.D.'s (−325 mesh) | 27.4 | 5.56 | 16.6 |
| F.P. (+35 mesh) | [0.2] | 13.97 | 0.3 |
| F.P. (−35 +325 mesh) | [30.3] | 11.76 | 39.0 |
| F.P. (−325 mesh) | [12.2] | 13.05 | 17.4 |
| Composite Matrix | 100.0 | *9.15 | 100.0 |
| Total Concentrate [composite of bracketed figures] | [72.6] | 10.51 | 83.4 |

*Calculated Value.

Data in Table III show that 83.4 percent of the P of the matrix could be recovered in the form of concentrate of 10.51 percent grade by subjecting the matrix to flotation and combining all of the froth product with all of the deslimed flotation tailings. The data show that with this matrix, the minus 35 mesh, plus 325 mesh portion of the combined machine discharge products was exceptionally low in phosphate values. These data therefore indicate that the grade of the overall phosphate concentrate could be improved with a slight reduction in recovery by discarding the minus 35, plus 325 mesh portion of the combined machine discharge products before combining the deslimed machine discharge product with the froth product.

The data also indicate that flotation was highly selective to the minus 325 mesh phosphate minerals in the matrix since the floated minus 325 mesh material had an exceptionally high grade of 13.05 percent P as compared with a grade of only 5.56 percent P for the minus 325 mesh flotation tailings.

From the fact that 34.0 percent of the P values of the blunged matrix were found to be finer than 325 mesh, it was calculated that 51.2 percent $$\left(=\frac{17.4}{34.0}\times 100\right)$$

of the minus 325 mesh phosphate minerals in the blunged feed reported in the froth product.

*Example V*

Following are summarized data for results of several examples of the process of this invention as applied to a sample of the same phosphate matrix of Example I that had been crushed to minus ½" as in Example I. In these tests, fractions of the matrix were blunged in solutions of sodium hydroxide in a paddle mixer at matrix solids ranging from 25 percent to 60 percent. NaOH was used in amounts of 3.0, 4.0 and 5.5 pounds per ton when the matrix was blunged at 25 percent, 50 percent and 60 percent solids, respectively. The blunged matrices were conditioned for a total of seventeen minutes with crude tall oil in amount of 4.5 pounds per ton and with 8.5 pounds per ton of fuel oil. In the flotation step, the whole ore was processed and given one rougher flotation with three cleaner floats. The flotation tailings were combined and screened on a 325 mesh screen to remove clay slime and the deslimed tailings were combined with the froth product.

Results are summarized in Table IV.

TABLE IV

| Percent Solids in Conditioning Step | Overall Concentration | | | Overall Tailings | |
|---|---|---|---|---|---|
| | Wt. percent | Percent P. | P. Dist., percent | Wt. percent | Percent P. |
| 25 | 62.7 | 11.63 | 85.7 | 37.3 | 3.27 |
| 50 | 60.3 | 11.79 | 83.7 | 39.7 | 3.49 |
| 60 | 55.3 | 12.71 | 80.7 | 44.7 | 3.76 |

These data show that product grade was increased substantially at a slight reduction in recovery by conditioning at high solids.

While in the preceding examples, the slimes were arbitrarily cut off at 325 mesh (44 microns), it will be distinctly understood that it is fully within the scope of this invention to deslime the machine discharge of the flotation step at other limiting particle sizes. For example, the tailings could be screened through a screen as coarse as 200 mesh and the minus 200 mesh fraction discarded. On the other hand, the cutoff can be made at a much finer particle size, e.g., 10 microns, by hydraulic classification equipment, such as, for example, hydro-separators or cyclones. With the matrix of Example IV, the desliming could have been at 35 mesh since the 35 to 325 mesh fraction of the flotation tailing contained only 3.92 percent P.

All mesh sizes mentioned in the specification and claims refer to values obtained with Tyler standard screen-scale sieves.

The term "slime" as employed in the specification and claims refers to particles which, when dispersed in water, are fine enough to pass through a 325 mesh Tyler screen.

I claim:
1. A method for beneficiating phosphate matrix containing gangue including sand and clay and also containing friable agglomerates of slimed phosphate minerals which would normally report in washer slimes when said matrix is blunged and then deslimed to eliminate clay, said method comprising:
   forming a blunged aqueous pulp of said matrix containing a dispersing agent, without desliming said pulp, subjecting it to froth flotation with an anionic collector reagent for selectively floating slimed phosphate minerals, thereby producing a froth product which is a concentrate of slimed phosphate minerals and a tailing which is a mixture of clay slimes, coarse phosphate minerals and sand, desliming said tailing, and recovering said froth product and said deslimed tailing.

2. The method of claim 1 wherein matrix particles coarser than about 35 mesh are removed from said pulp before flotation whereby only matrix particles finer than 35 mesh are subjected to froth flotation and said matrix particles coarser than about 35 mesh are recovered.

3. The method of claim 1 wherein said aqueous pulp is conditioned for floation with crude tall oil and neutral hydrocarbon oil and subjected to flotation in an alkaline circuit.

4. The method of claim 1 wherein said matrix is blunged in water containing an alkaline clay dispersing agent, whereby the amount of water required to form a flowable pulp of said matrix is reduced, and said matrix is conditioned for flotation at about 50 percent to 60 percent solids.

5. In a method for beneficiating phosphate matrix which comprises blunging said matrix in water and then desliming the blunged matrix, said matrix containing gangue including sand and clay and also containing friable agglomerates of slimed phosphate minerals which normally report in washer slimes when said matrix is blunged and then deslimed to eliminate clay, the improvement which comprises:
   blunging said matrix in an aqueous solution of clay dispersing agent, without removing slimes from said blunged matrix, subjecting it to froth flotation with an anionic collector reagent for selectively floating slimed phosphate minerals, thereby producing a froth product which is a concentrate of finely divided phosphate minerals and a tailing which is a concentrate of clay slimes, coarse phosphate minerals and sand, desliming said tailing, discarding slimes obtained thereby, and recovering said froth product and said deslimed tailing.

6. A method for beneficiating phosphate matrix in a manner such that a substantial amount of slimed phosphate minerals are recovered which comprises:
   blunging a phosphate matrix in water containing a clay dispersing agent, said phosphate matrix containing siliceous gangue including sand and clay and also containing friable agglomerates of slimed phosphate minerals which would normally report in washer slimes when said matrix is blunged and then deslimed,
   without desliming the blunged aqueous matrix, conditioning it for froth flotation with a negative ion collector reagent selective to phosphate minerals in said matrix, subjecting the conditioned aqueous matrix to froth flotation, producing a froth product which is a concentrate of slimed phosphate minerals in the blunged aqueous matrix and a tailing which is a clay-contaminated concentrate of course phosphate and sand,
   desliming said tailing so as to remove clay therefrom, and combining at least a portion of said froth product with at least a portion of said deslimed tailing.

7. A method for beneficiating Tennessee phosphate matrix in a manner such that slimed phosphate minerals are recovered which comprises:
   blunging Tennessee phosphate matrix in water containing a clay dispersing agent with sufficient agitation to form an aqueous pulp containing fine and coarse phosphate minerals, sand and dispersed clay, an appreciable proportion of said fine phosphate minerals being fine enough to pass through a 325 mesh screen, without desliming the aqueous blunged matrix, conditioning it for froth flotation with a fatty acid collector reagent selective to phosphate minerals in said matrix, subjecting the conditioned aqueous matrix to froth flotation in an alkaline flotation circuit, producing a froth product which is a concentrate of phosphate minerals in the blunged aqueous matrix and a tailing which is a clay-contaminated concentrate of coarse phosphate minerals and sand, desliming said tailing so as to remove clay slime therefrom, discarding clay slimes and combining at least a portion of said froth product with at least a portion of said deslimed tailing.

8. The method of claim 7 wherein said matrix is screened before flotation, separating a plus 35 mesh fraction of the matrix and subjecting the minus 35 mesh fraction of the matrix to flotation, recovering said plus 35 mesh fraction of the matrix and combining it with said froth product and said deslimed tailing.

9. The method of claim 7 wherein said tailing is deslimed at about minus 325 mesh.

10. A method for recovering a phosphate-silica concentrate suitable for use as electric furnace feed in the production of elemental phosphorus from a Tennessee phosphate matrix which comprises fine and coarse phosphate minerals including agglomerates of minus 325 mesh phosphate minerals, sand and agglomerates of clay, said method comprising:

blunging said matrix in water containing an alkaline clay dispersing agent, thereby dispersing said clay agglomerates and also dispersing said phosphate agglomerates into minus 325 mesh particles, without desliming said dispersed aqueous matrix, incorporating crude tall oil and neutral hydrocarbon oil therein with agitation, subjecting said aqueous matrix to froth flotation in an alkaline flotation circuit, thereby producing a froth product which is a concentrate of minus 325 mesh phosphate minerals in said blunged matrix and a tailing which is a concentrate of coarse phosphate minerals and sand contaminated with dispersed clay, subjecting said tailing to hydraulic particle size classification in a manner such as to remove substantial quantities of minus 325 mesh particles therefrom, and combining at least a portion of said froth product with at least a portion of said tailing after removal of minus 325 mesh particles therefrom, thereby forming a phosphate-silica concentrate.

11. A method for beneficiating Tennessee phosphate matrix in a manner such that slimed phosphate values therein are recovered which comprises:

blunging Tennessee phosphate matrix with water containing sodium silicate dispersing agent, thereby forming an aqueous pulp comprising a mixture of coarse phosphate mineral particles, sand, dispersed slimed phosphate mineral particles and dispersed clay particles, without removing slimed particles from said pulp, conditioning said pulp for froth flotation with tall oil and with neutral hydrocarbon oil cooperative collector reagent, subjecting the thus conditioned pulp to froth flotation in an alkaline circuit, thereby producing a froth product which is a concentrate of slimed phosphate mineral particles in said pulp and a tailing which is a concentrate of clay particles, sand and coarse phosphate mineral particles, desliming said tailing, thereby forming a clay slime which is discarded and producing a deslimed tailing product which is a mixture of coarse phosphate mineral particles and sand, and combining at least a portion of said deslimed tailing product with at least a portion of said froth product to form a phosphate enriched product including slimed phosphate mineral particles.

12. A method for beneficiating Tennessee phosphate matrix in a manner such that slimed phosphate values therein are recovered which comprises:

blunging Tennessee phosphate matrix in water containing sodium silicate so as to form an aqueous pulp containing coarse phosphate mineral particles, sand and a substantial quantity of dispersed slimed mineral particles, said slimed mineral particles being predominantly a mixture of phosphate minerals and clay, without removing slimed particles from said pulp, conditioning said pulp for froth flotation while maintaining the pH at a value within the range of about 8.0 to about 9.5 with crude tall oil and with a neutral hydrocarbon oil cooperative collector reagent, subjecting the thus conditioned pulp to froth flotation in an alkaline circuit to obtain a froth product which is a concentrate of slimed phosphate mineral particles in said pulp and a tailing which is a concentrate of coarse phosphate mineral particles, sand and clay, desliming said tailing, thereby producing a clay slime which is discarded and a deslimed tailing which is a mixture of coarse phosphate mineral particles and sand, and mixing at least a portion of said deslimed tailing with at least a portion of said froth product to produce a phosphate enriched product of at least 11 percent P grade and containing slimed phosphate values originally in said pulp.

13. A method for recovering phosphate values, including slimed phosphate values, from Tennessee phosphate matrix which comprises:

blunging Tennessee phosphate matrix in water containing an alkaline deflocculating agent comprising sodium silicate so as to produce an aqueous pulp of said phosphate matrix wherein clay particles originally present as lumps in said matrix ase dispersed and phosphatic agglomerates are broken down into slimed phosphate mineral particles which are dispersed, without removing any substantial quantity of slimed particles from said pulp, conditioning said pulp for froth flotatoin at a pH within the range of about 8.0 to about 9.5 with crude tall oil and with fuel oil, subjecting the thus conditioned pulp to froth flotation in an alkaline circuit, thereby producing a froth product which is a concentrate of slimed phosphate mineral particles in said pulp and a tailing which is a concentrate of coarse phosphate mineral particles, sand and clay particles, desliming said tailing thereby producing a clay slime which is discarded and a deslimed tailing which is a concentrate of coarse phosphate mineral particles and sand, free from clay, and combining at least a portion of said deslimed tailing with at least a portion of said said froth product to form a phosphate product including slimed phosphate mineral particles.

14. A method for beneficiating Tennessee phosphate matrix in a manner such as to recover minus 325 mesh phosphate values that are produced when said rock is crushed and then agitated strongly in water, which comprises:

crushing Tennessee phosphate matrix, blunging said crushed matrix at about 50 percent to about 60 percent solids in water containing an alkaline deflocculating agent comprising sodium silicate so as to disintegrate clay lumps in said matrix into particles finer than 325 mesh, whereby agglomerates of phosphate minerals in said matrix also disintegrate into particles finer than 325 mesh, adjusting the pH of said aqueous pulp to a value within the range of about 8.5 to 9.0, conditioning said pulp with about 4 to about 10 pounds per ton tall oil and from about 5 to about 10 pounds per ton fuel oil, without desliming said pulp, subjecting it to froth flotation in an alkaline circuit, thereby forming a froth product which is a concentrate of minus 325 mesh phosphate mineral particles in said pulp and a tailing which is a concentrate of coarse phosphate mineral particles, sand and clay, desliming said tailing to eliminate minus 325 mesh particles therefrom, thereby producing a minus 325 mesh fraction which is a concentrate of clay and a plus 325 mesh concentrate which is a mixture of coarse phosphate mineral particles and sand, discarding said minus 325 mesh fraction and mixing at least a portion of said plus 325 mesh concentrate with said froth product to produce a phosphate-sand mixture of at least 1 percent P grade and suitable for use in producing elemental phosphorus.

References Cited by the Examiner

UNITED STATES PATENTS

| | | | |
|---|---|---|---|
| 1,448,514 | 3/1923 | Borcherdt | 209—5 |
| 1,585,756 | 5/1926 | Borcherdt | 209—5 |
| 2,163,701 | 6/1939 | Ried | 209—166 |
| 2,249,570 | 7/1941 | Lane | 209—166 |
| 2,381,514 | 7/1945 | Phelps | 209—5 |
| 2,660,303 | 11/1953 | Haseman | 209—5 |
| 2,676,705 | 3/1954 | Duke | 209—166 |
| 2,914,173 | 11/1959 | LeBaron | 209—166 |

HARRY B. THORNTON, *Primary Examiner.*

R. HALPER, *Assistant Examiner.*

UNITED STATES PATENT OFFICE
CERTIFICATE OF CORRECTION

Patent No. 3,302,785                                 February 7, 1967

Ernest W. Greene

It is hereby certified that error appears in the above numbered patent requiring correction and that the said Letters Patent should read as corrected below.

Column 14, line 43, for "ase" read -- are --; column 16, line 4, for "1 percent" read -- 11 percent --.

Signed and sealed this 17th day of October 1967.

(SEAL)
Attest:

Edward M. Fletcher, Jr.                              EDWARD J. BRENNER
Attesting Officer                                        Commissioner of Patents